United States Patent Office 3,430,454
Patented Mar. 4, 1969

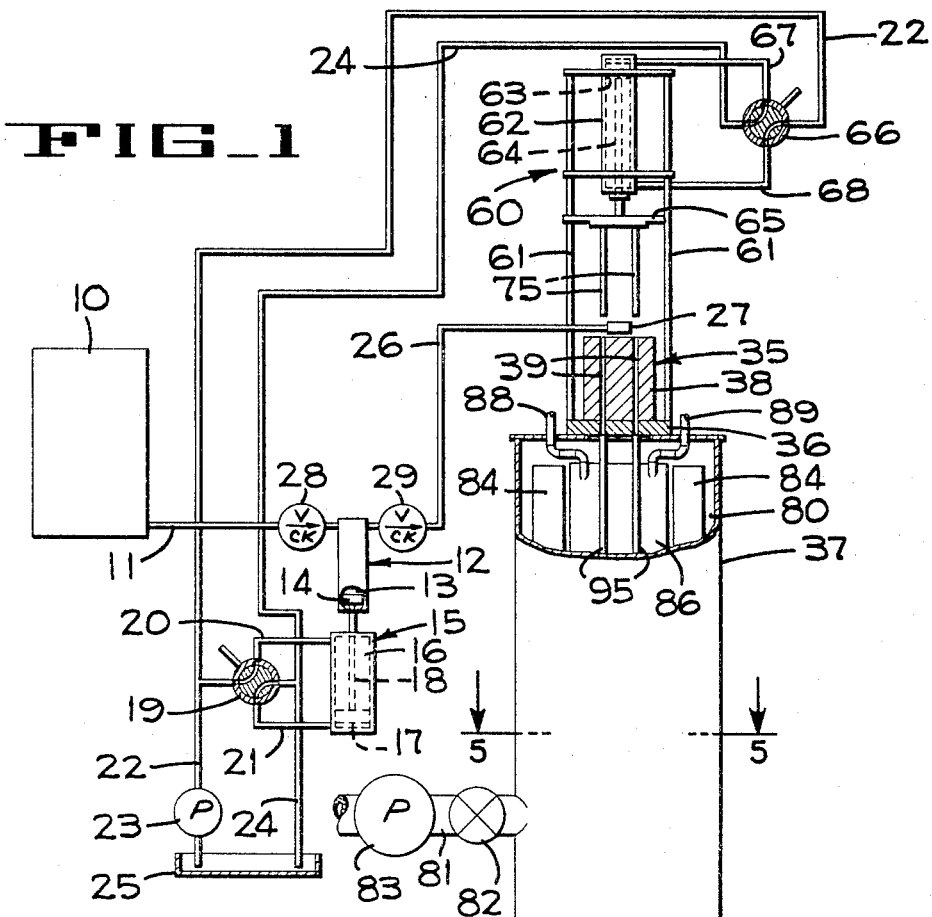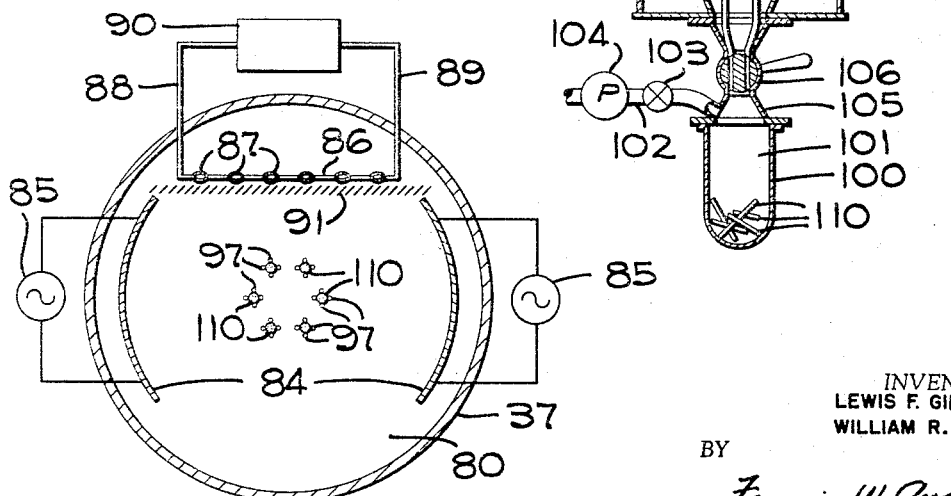

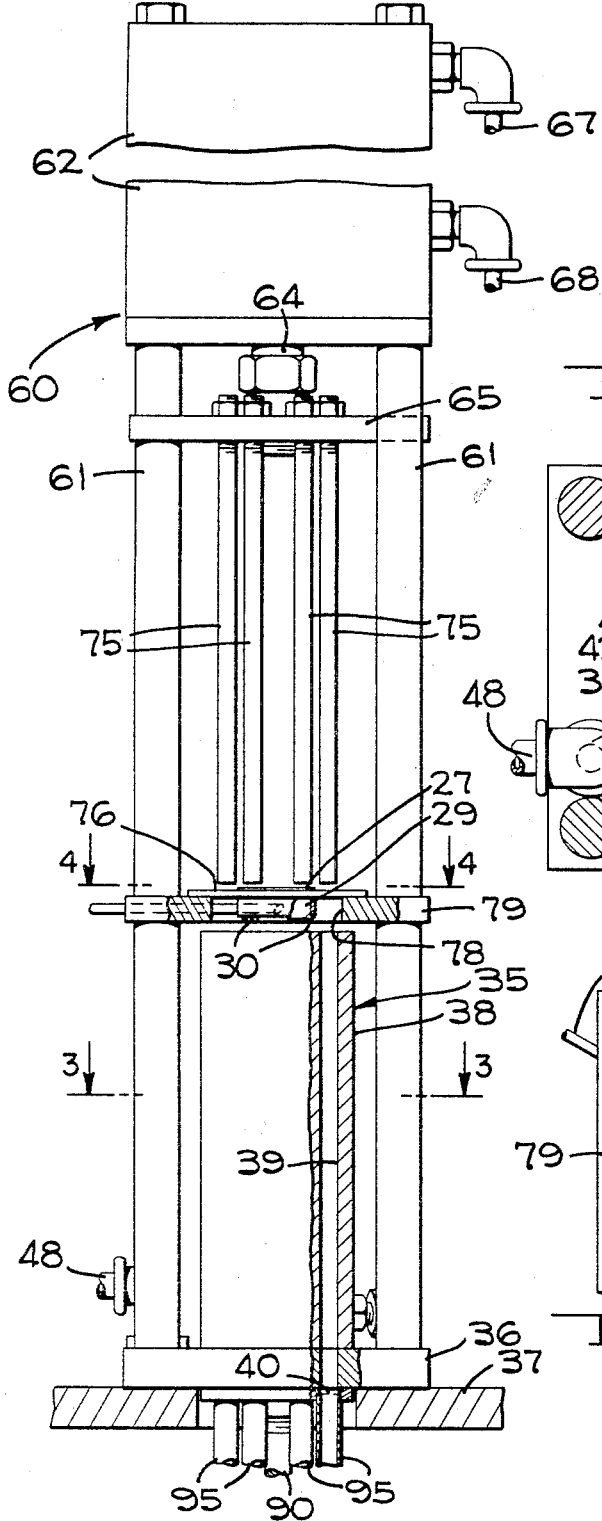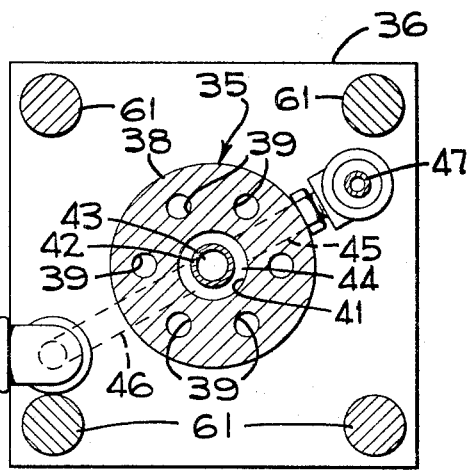

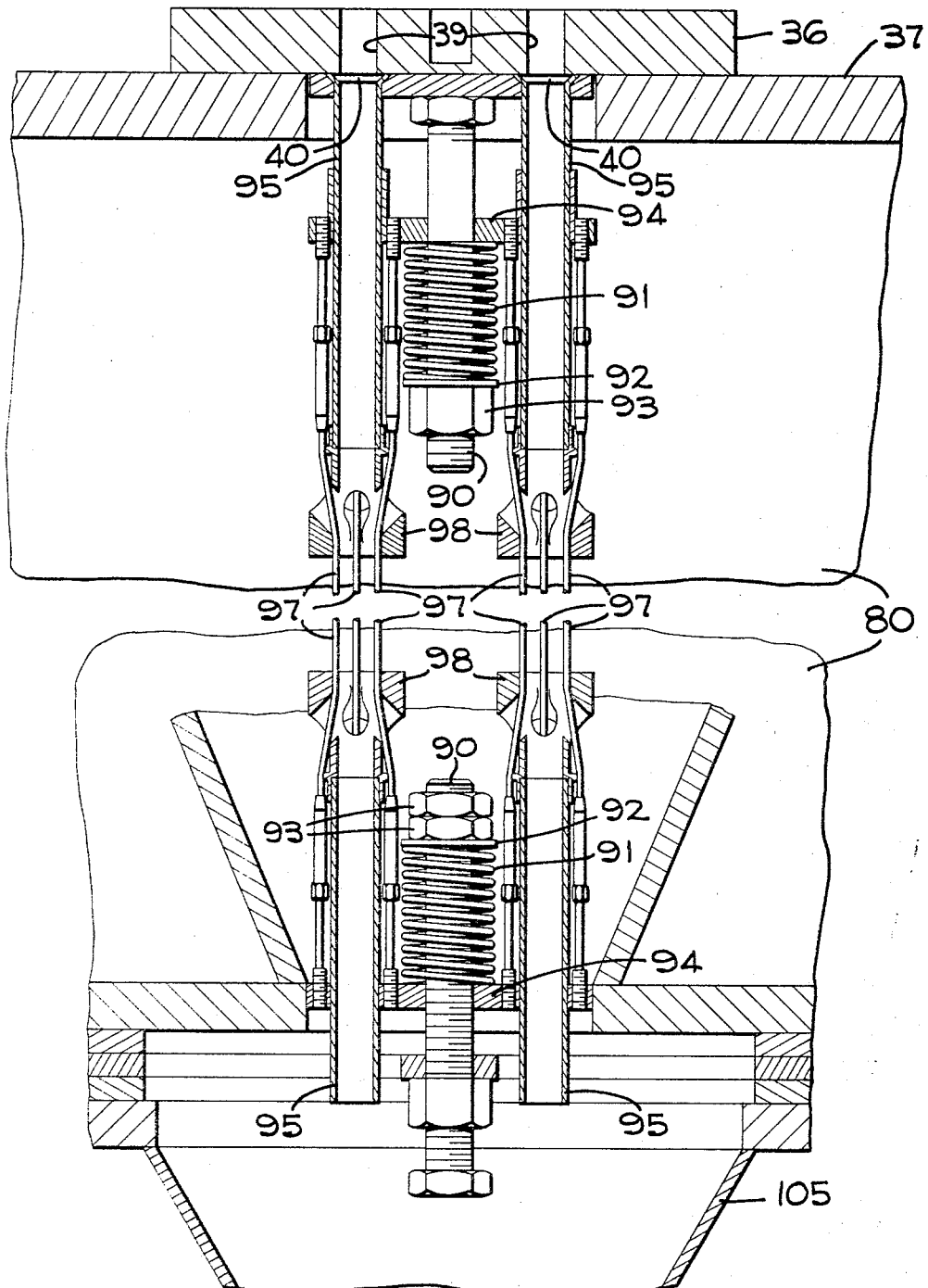
FIG_6

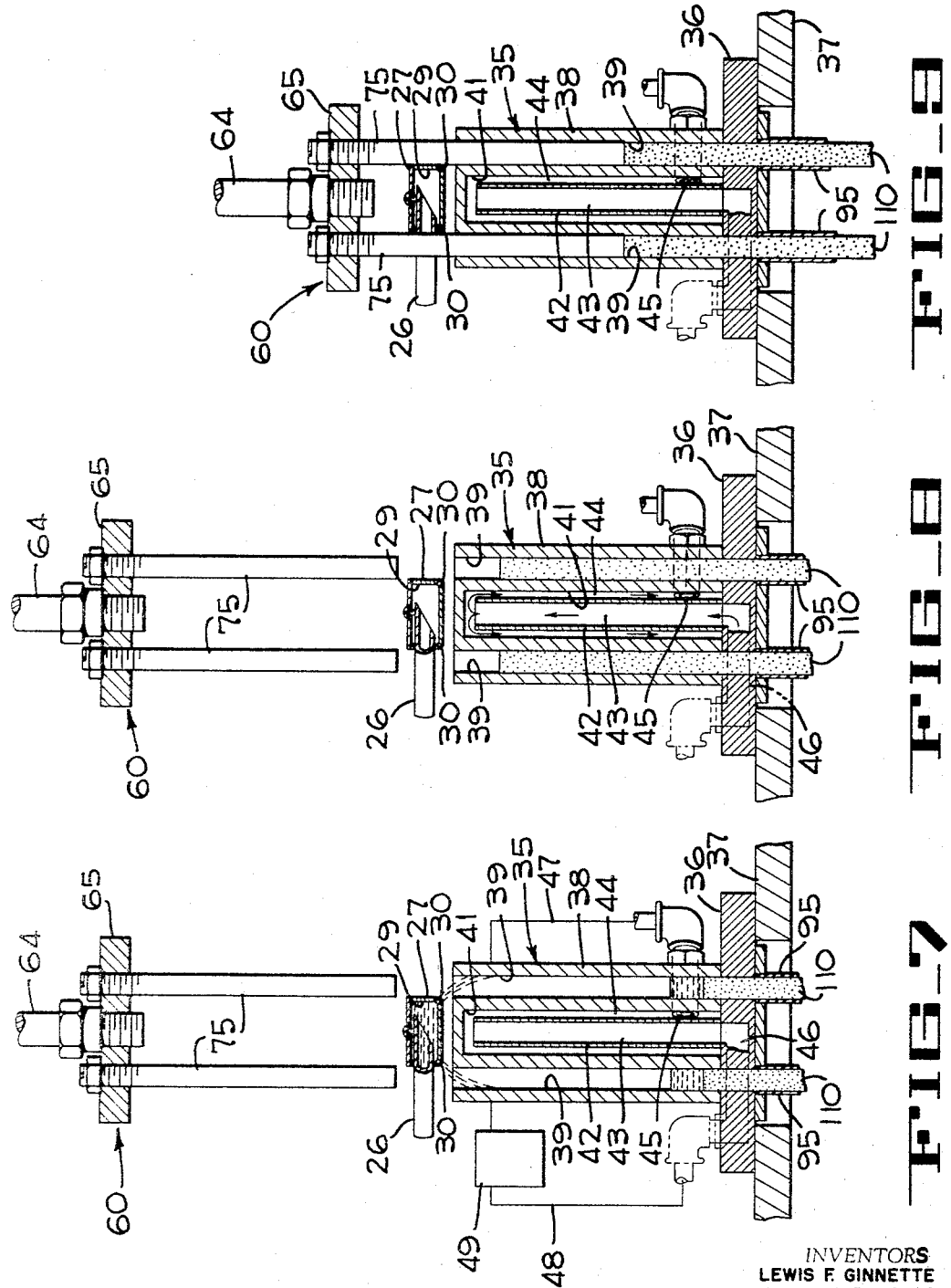

3,430,454
APPARATUS FOR INTRODUCING SUBSTANCE INTO VACUUM CHAMBER
Lewis F. Ginnette, Cupertino, Calif., and William R. Scalf, Richmond, Ind., assignors to FMC Corporation, San Jose, Calif., a corporation of Delaware
Filed Mar. 10, 1967, Ser. No. 627,245
(Filed under Rule 47(a) and 35 U.S.C. 116)
U.S. Cl. 62—353                                                 10 Claims
Int. Cl. F25c *1/12;* F26b *5/06, 5/10*

ABSTRACT OF THE DISCLOSURE

A substance is continuously introduced into a freeze drying vacuum chamber without loss of vacuum therein. The substance in liquid form is pumped into cylindrical chambers of a heat exchanger, each of said chambers terminating at an opening into the vacuum chamber. The substance is frozen into a set of rod segments which are forced by reciprocable pusher rods partially through said openings. Succeeding sets of rod segments are formed, each set partially pushed through said openings and forcing the preceding set the rest of the way through the openings on each stroke of the pusher rods so that the openings are always sealed by frozen rod segments.

---

The present invention relates to apparatus for the introduction of frozen material into a vacuum chamber as, for example, in freeze drying food substances.

In freeze drying, a substance, such as a potable food product, is frozen and dehydrated at subatmospheric pressure by sublimation of the ice therein. Freeze drying is particularly suitable for processing food substances because none of the basic properties of the food substance are lost during the drying process. Food products dehydrated in this manner possess all their original values when reconstituted by the addition of water.

In one freeze drying process, a food substance is frozen and introduced through an opening into a vacuum chamber for drying. The frozen substance serves to seal the opening and, in order to maintain the vacuum in the vacuum chamber, the frozen substance must continuously fill the opening.

In the present invention, apparatus is provided to extrude a frozen food substance in steps through an opening in the vacuum chamber and maintain frozen substance in that opening during the operation of the process.

Handling a frozen substance, either mechanically or manually, prior to the introduction thereof into the vacuum chamber can add significantly to the expense of the process. Accordingly, it is one object of the present invention to provide for freezing and inserting a frozen substance into a vacuum chamber with minimum handling and equipment. Briefly, this is accomplished by providing a heat exchanger connected to the vacuum chamber and having at least one elongated chamber extending therethrough which terminates at an opening in the vacuum chamber. Liquid poured into the outer end of the elongated chamber is frozen therein and extruded therefrom by a reciprocating pusher rod which engages the frozen material and forces it directly into the vacuum chamber.

Since it is necessary that some frozen material always fill the elongated chamber in order to seal the opening to the vacuum chamber, it is another object of the present invention to provide extruding mechanisms which will always leave a portion of a frozen segment in the chamber from which the substance is extruded. To this end, the pusher rod has a fixed stroke terminating short of the inner end of the elongated chamber so that, on each stroke of the pusher rod, only a portion of the segment of substance frozen in the chamber is extruded into the vacuum chamber. The remaining portion of the frozen segment remains in the elongated chamber, sealing the opening into the vacuum chamber.

It is necessary for efficient operation to continuously feed frozen substance into the vacuum chamber and it is, accordingly, yet another object of the present invention to provide mechanism which will freeze and extrude successive segments of substance repeatedly. This is accomplished by establishing the outer limit of the fixed stroke of the pusher rod beyond the outer end of the elongated chamber so that, on each stroke, the pusher rod is retracted from the elongated chamber to permit the insertion of additional liquid therein. When this liquid freezes, the pusher rod is advanced to extrude a portion of the frozen segment into the vacuum chamber, forcing the balance of the preceding segment into the vacuum chamber. Thus, successive segments form one continuous elongated bar, or rod, which is advanced by steps into the vacuum chamber and which continuously fills the opening into the vacuum chamber.

In order to make the most effective use of the vacuum chamber and obtain a maximum rate of dehydration, more than one elongated freezing chamber and pusher rod are provided. A circular array of parallel, cylindrical chambers receive liquid from a distribution manifold which is positioned adjacent the outer end of the heat exchanger and centrally with respect to the freezing chambers thereof. A gang of pusher rods is received in the mold chambers to simultaneously extrude portions of a plurality of frozen segments into the vacuum chamber. On each stroke of the gang of pusher rods, an additional set of frozen segments is formed, contiguous with the previous set of segments, to form a plurality of continuous elongated rods of frozen substance continuously fed in steps into the vacuum chamber.

In the drawings:

FIGURE 1 is a somewhat schematic view of the apparatus of the present invention in conjunction with freeze drying apparatus;

FIGURE 2 is an enlarged view of the apparatus of the present invention;

FIGURE 3 is a view taken on the line 3—3 of FIGURE 2;

FIGURE 4 is a view taken on the line 4—4 of FIGURE 2;

FIGURE 5 is an enlarged view taken on the line 5—5 of FIGURE 1;

FIGURE 6 is an enlarged view inside the vacuum vessel of the freeze drying apparatus; and FIGURES 7, 8 and 9 are schematic drawings illustrating the operation of the present invention.

There is shown in FIGURE 1 of the drawings a container 10 for the storage of a liquid such as coffee extract. The container 10 is connected by a line 11 to the fixed stroke pump 12. The pump 12 has a pump chamber 13 in which a pump piston 14 is slidably received. A hydraulic fixed stroke motor 15, comrising a cylinder 16 with piston 17 received therein, operates the pump 12. The piston 17 has a connecting rod 18 which is connected to the pump piston 14. The motor 15 is controlled by the operation of a valve 19 which is connected thereto by lines 20 and 21. By means of the valve 19, which is connected to a pressure line 22 leading from hydraulic pump 23 and a discharge line 24 leading to sump 25, pressure can be applied alternately to one side or the other of the piston 17 to operate the fixed stroke pump 12.

The pump 12 is connected by line 26 to a liquid distribution manifold 27. Check valves 28 and 29 in the lines 11 and 26, respectively, permit the drawing of a predetermined quantity of coffee extract from container 10 into the pump chamber of pump 12 and expelling that quantity of liquid through line 26 to the distribution manifold 27. The manifold 27 has a central chamber 29 which is in communication with six equally angularly spaced outlet passages 30 (see FIG. 2).

A heat exchanger 35 is mounted on a top plate 36 of vessel 37, and has a stainless steel body 38 mounted on the top plate. Six equally angularly spaced elongated cylindrical chambers, or bores, 39 extend through the body 38 and the top plate 36, terminating at their inner ends at openings 40 inside vessel 37. The body 38 also has a central blind bore 41 (see FIG. 3) in which a tube 42 is received, the upper end of tube 42 being spaced from the upper end of the bore 41, as shown in FIGURE 7. The central bore and the tube together define two concentric passages 43, 44. The outer passage 44 connects with a radial passage 45 through the body 38, and the inner passage 43 connects with a radial passage 46 through the plate 36. Radial passages 45 and 46 are connected, respectively, to refrigerant lines 47 and 48 (see FIG. 7) emanating from refrigerating apparatus 49. During operation of the equipment, refrigerant circulates from the heat exchanger through the passages 43 and 44 to freeze liquid received in the chambers 39 from the distribution manifold 27.

An extrusion mechanism 60 is mounted on four upstanding shafts 61 which are secured to the top plate 36 and which extend upwardly therefrom around the heat exchanger 35. A cylinder 62, which is mounted on top of the shafts 61, has a piston 63 slidably received therein (see FIG. 1). The piston 63 is connected by means of connecting rod 64 to a plate 65 which is slidably received on two of the shafts 61. A valve 66, which is connected to pressure line 22 and exhaust line 24, is connected by lines 67 and 68 to the ends of cylinder 62. Operation of the valve can selectively expose one side of piston 63 to pressure or alternately the other side of the piston to pressure to move the plate 65 in one direction or the other.

Six parallel pusher bars, or rods, 75 are mounted on plate 65 in a circular array corresponding to the circular array of the six parallel bores 39 in the heat exchanger body. At the upper limit of the fixed stroke of piston 63, the ends of the pusher rods are above the top of the heat exchanger 35 and above the distributor manifold 27. The manifold 27 is tightly secured in an opening in a circular plate 76 which has six angularly spaced holes 77 through which the rods 75 can pass. Plate 76 is mounted over a circular opening 78 in a plate 79. The plate 79 tightly receives the shafts 61, as shown in FIGURE 4, and is fixedly mounted thereon. With the ends of the pusher rods above the heat exchanger 35 and the manifold 27, liquid may be poured into the upper end of the bores 39 from the manifold 27, as shown in FIGURE 7. At the lower limit of the fixed stroke of piston 63, the ends of the pusher rods are above the bottom of bores 39, so that the pusher rods can never push all frozen substance out of the bores, as indicated by FIGURE 7 which shows the top of the previously extruded frozen segments above the bottom of the bores 39.

The vacuum vessel 37 defines a chamber 80 as shown in FIGURES 1 and 5, which is in communication, through passage 81 and valve 82, with apparatus, such as a pump 83, for producing a vacuum in the chamber. The chamber 80 has curved heating plates 84 therein, each connected electrically to a source of electrical energy 85. A cold plate 86 has passages 87 therethrough which connect by lines 88, 89 to a refrigerating apparatus 90 for the circulation of refrigerant through the plate. A louvered heat shield 91, made of insulating material, is positioned between the heating plates 84 and the refrigerated plate 86.

At the top and bottom of chamber 80, as shown in FIGURE 6, studs 90 receive springs 91 thereon. The springs 91 are received between washers 92, which are held on the end of the studs by nuts 93, and plates 94, which are received on the studs spaced from the washers. Six parallel vertical guide tubes 95 are mounted in, and extend through, the plates 94, each in axial alignment with one of the chambers 39 in the heat exchanger. Four cables 97, connected to plate 94, surround each guide tube 95 and extend through a fitting 98 connected to the inner end of each tube 95. The cables extend between corresponding aligned guide tubes 95 at the top and bottom of the chamber and, with the guide tubes, define six guides for frozen material extruded from the heat exchanger.

As shown in FIGURE 1, an auxiliary vacuum vessel 100 has a chamber 101 which communicates through passage 102 and valve 103 with apparatus, such as pump 104, for producing a vacuum in the chamber. The auxiliary vacuum vessel 100 is connected to one end of a housing 105, the opposite end of which is connected to vacuum vessel 37. The housing 105 contains a valve 106. When the valve 106 is open, dehydrated substance from chamber 80 can pass through the valve to chamber 101; when valve 106 is closed, chamber 80 is hermetically sealed from chamber 101. Vessel 100 is detachably connected to housing 105 so that dehydrated material deposited in vessel 100 can be removed therefrom.

To begin operation of the equipment disclosed herein, plugs of frozen substance are positioned at the inner ends of the bores 39 in the heat exchanger. These frozen plugs may be inserted into the bores 39 in frozen form and pushed to the inner end thereof by the pusher rods 75. With the plugs in place and valve 106 open, a vacuum can be established in vacuum chamber 80 and vacuum chamber 101 by pump 83.

The pusher rods are then retracted, as shown in FIGURE 7, and a predetermined quantity of liquid such as liquid coffee, is pumped through line 26 and manifold 27 to the elongated chambers 39 by a single stroke of the fixed stroke pump 12. The predetermined quantity of liquid supplied to the chambers 39, which may be considered mold chambers, fills the chambers to a level near the top, as shown in FIGURE 8. The liquid in the chambers is cooled by refrigerant circulating through the heat exchanger, which rapidly freezes the coffee extract to form segments of frozen rods or food substance 110. The extrusion mechanism is then operated to advance pusher rods 75 and extrude a portion of the frozen segments through the openings 40 and guide tubes 95 into the vacuum chambers, pushing the frozen plugs before them. Because the stroke of the pusher rods 75 ends short of the lower end of the mold chambers 39, a small portion of each segment 110 remains in the mold chamber, as shown in FIGURE 7, thereby maintaining the vacuum in chamber 80 and 101.

The pusher rods 75 are then retracted, and the mold chambers 39 refilled with liquid. As the liquid freezes, an additional set of frozen segments 110 are formed which abut the previous set of segment of frozen material to form continuous bars, or rods, of frozen material. Each advance of the pusher rods forces the remainder of the previous set of frozen segments into the vacuum chamber, and additionally forces a portion of the most recently frozen set of segments into the vacuum chamber. But on each advance of the pusher rods, the final portion of the most recently frozen set of segments remains in the mold chambers to continuously hermetically seal the vacuum chamber. Thus, the frozen substance forms continuous rods which advance in steps through the vacuum chamber.

In the vacuum chamber, the ice in the frozen segments of coffee extract is passed off as vapor because of the low pressure in the chamber. The vapor passes through the louvered heat shield and condenses on the cold plate. The dehydrated rods pass in steps through the valve 106 into the auxiliary vacuum chamber 101. Periodically, the valve 106 is closed, breaking off the rods and sealing the main vacuum chamber. The vessel 100 is then detached from housing 105, the dry rod fragments removed therefrom, and the vessel 100 reconnected to the housing 105. The vacuum in vessel 100 is reestablished by means of the vacuum pump 104 and, thereafter, the valve 106 is reopened.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, we claim:

1. Mechanism for introducing a substance initially in liquid form through an opening into a vacuum chamber comprising in combination with said chamber refrigerating apparatus in communication with said opening to cool the liquid outside said opening into a frozen substance, and a reciprocating extruder having a pusher bar to engage the frozen substance and force said substance in steps through said opening to continuously seal said opening.

2. Mechanism for introducing a substance initially in liquid form through an opening into a vacuum chamber comprising in combination with said chamber:
   (a) a heat exchanger having a freeze chamber outside the vacuum chamber to receive the liquid, said freeze chamber in communication with said opening,
   (b) refrigerating apparatus to circulate a refrigerant through the heat exchanger to cool the substance to a frozen mass, and
   (c) reciprocable extrusion apparatus having a pusher bar to engage the frozen mass and extrude said mass in steps through said opening to continuously seal said opening.

3. Mechanism for introducing a substance initially in liquid form through an opening into a vacuum chamber without loss of vacuum in the chamber comprising in combination with said chamber:
   (a) a heat exchanger outside the vacuum chamber, said heat exchanger having an elongated freeze chamber to receive said liquid, said freeze chamber in communication with said opening,
   (b) refrigerating apparatus to circulate a refrigerant through the heat exchanger for cooling the substance into a frozen bar, and
   (c) reciprocable extruding apparatus having a pusher bar to engage the frozen bar and push said frozen bar in steps out of said elongated chamber and through said opening, said frozen bar continuously filling the opening to seal against loss of vacuum.

4. Mechanism for introducing a substance initially in liquid form into a vacuum chamber without loss of vacuum in the chamber comprising in combination with said chamber:
   (a) a heat exchanger outside the vacuum chamber, said heat exchanger having a plurality of elongated chambers to receive the liquid, the inner end of said elongated chambers defining openings into said vacuum chamber,
   (b) refrigerating apparatus to circulate a refrigerant through the heat exchanger for cooling the substance into a plurality of frozen bars, and
   (c) extruding apparatus having a plurality of reciprocable pusher bars to enter, respectively, said elongated chambers and force said frozen bars through said openings, said frozen bars filling said openings to seal against loss of vacuum in the vacuum chamber.

5. The mechanism of claim 4 in which said pusher bars are received in, and retract from, the outer ends of said cylindrical chambers, and in which the liquid is introduced into the outer ends of the elongated chambers while the pusher bars are retracted.

6. Mechanism for introducing a substance initially in liquid form into a vacuum chamber through an opening thereof without loss of vacuum in the chamber comprising in combination with said chamber:
   (a) a heat exchanger outside the vacuum chamber, said heat exchanger having an elongated freeze chamber terminating at said opening and in communication therewith,
   (b) refrigerating apparatus to circulate a refrigerant through the heat exchanger for freezing liquid received in the elongated chamber thereof into an elongated rod segment,
   (c) a pusher bar,
   (d) means to advance said pusher bar into and retract said pusher bar from said elongated chamber, said pusher bar urging a portion of said elongated frozen rod segment through said opening on each advance, and
   (e) means to refill the elongated chamber with liquid on each retraction of the pusher bar.

7. Mechanism for introducing a substance initially in liquid form into a vacuum chamber without loss of vacuum in the chamber comprising in combination with said chamber:
   (a) a heat exchanger outside the vacuum chamber, said heat exchanger having an elongated freeze chamber with a central longitudinal axis, said elongated chamber open at its outer end and terminating at its inner end at an opening into said vacuum chamber for commuication therewith,
   (b) means to fill said elongated chamber from the outer end with said liquid,
   (c) a refrigerating apparatus to circulate a refrigerant through the heat exchanger for cooling the substance into an elongated frozen bar,
   (d) a pusher bar lying in the longitudinal axis of said elongated chamber, said pusher bar reciprocable between an extreme outer position outside said elongated chamber and an extreme inner position within said elongated chamber,
   (e) means to reciprocate said pusher bar between said extreme positions to force the frozen substance in steps through said vacuum chamber opening, said pusher bar leaving frozen substance in the vacuum chamber opening on each cycle to seal the vacuum chamber against loss of vacuum.

8. The mechanism of claim 7 in which said elongated chamber is cylindrical to produce frozen rod segments.

9. Mechanism for introducing a substance initially in liquid form into a vacuum chamber without loss of vacuum in the chamber comprising in combination with said chamber:
   (a) a heat exchanger outside the vacuum chamber, said heat exchanger having a plurality of elongated freeze chambers therein, said elongated chambers each opens at its outer end and each terminating at its inner end at an opening into the vacuum chamber for communication therewith,
   (b) refrigerating apparatus to circulate a refrigerant through the heat exchanger for freezing liquid received therein into a plurality of frozen rods,
   (c) a plurality of pusher rods movable through a fixed stroke between an extreme outer position outside of said elongated chambers and an extreme inner position inside said elongated chambers, respectively, said pusher rods forcing a portion of each of said frozen rods through said vacuum chamber openings on each advance of the pusher rods into the elongated chambers, and (d) a pump to refill said elongated chambers with liquid on each retraction of said rods out of said elongated chambers.

10. The mechanism of claim 9 in which said openings into the vacuum chamber are circular, and said elongated chambers are cylindrical to produce frozen cylindrical rod segments.

References Cited

UNITED STATES PATENTS

| | | | |
|---|---|---|---|
| 2,071,465 | 2/1937 | Huber | 62—354 X |
| 3,085,520 | 4/1963 | Fiedler | 62—320 X |
| 3,196,628 | 7/1965 | Reynolds | 62—137 |
| 3,218,731 | 11/1965 | Stinchfield | 62—345 |
| 3,223,090 | 12/1965 | Strubel et al. | 34—5 X |

ROBERT A. O'LEARY, *Primary Examiner.*

WILLIAM E. WAYNER, *Assistant Examiner.*

U.S. Cl. X.R.

34—92, 242; 62—71